United States Patent [19]

Müller et al.

[11] Patent Number: 4,776,834

[45] Date of Patent: Oct. 11, 1988

[54] CENTRIFUGE

[75] Inventors: Dieter Müller, Badenhausen; Peter Pantucek, Darmstadt, both of Fed. Rep. of Germany

[73] Assignee: Heraeus Sepatech GmbH, Osterode, Fed. Rep. of Germany

[21] Appl. No.: 31

[22] Filed: Jan. 2, 1987

[30] Foreign Application Priority Data

Mar. 7, 1986 [DE] Fed. Rep. of Germany ....... 3607505

[51] Int. Cl.$^4$ .............................................. B04B 9/00
[52] U.S. Cl. .................................... 494/84; 279/2 R; 403/370
[58] Field of Search ........................ 494/84, 82, 16, 43, 494/46, 85, 83; 279/2 R; 403/370

[56] References Cited

U.S. PATENT DOCUMENTS

| | | | |
|---|---|---|---|
| 1,373,085 | 3/1921 | Leitch | 494/84 |
| 3,990,633 | 11/1976 | Stahl | 494/84 |
| 4,101,070 | 7/1978 | Hoare | 494/84 |
| 4,304,502 | 12/1981 | Stratienko | 403/370 |
| 4,412,830 | 11/1983 | Strain | 494/16 |
| 4,568,325 | 2/1986 | Cheng | 494/16 |

FOREIGN PATENT DOCUMENTS

WO83/04379 12/1983 PCT Int'l Appl. ................ 494/84

OTHER PUBLICATIONS

*Primary Examiner*—Robert W. Jenkins
*Attorney, Agent, or Firm*—Felfe & Lynch

[57] ABSTRACT

Centrifuges are known which have a working head placed on a shaft driven by a motor, and in which a longitudinally slotted sleeve is disposed between the shaft and a central bore in the working head. This sleeve is expanded against the bore by a conical spreader driven by a threaded element screwed onto the end of the drive shaft. To create a tight and wobble-free coupling between the working head and the drive shaft of the centrifuge which will be secure even after long use and frequently changing torque, but which will assure easy release, the shaft has a tapered end and on this end, which reaches into the central bore of the working head, is seated the spreader, which is in the form of a bushing with a tapering bore, and the threaded element has on its outer circumference projections which engage indentations in the spreader.

8 Claims, 1 Drawing Sheet

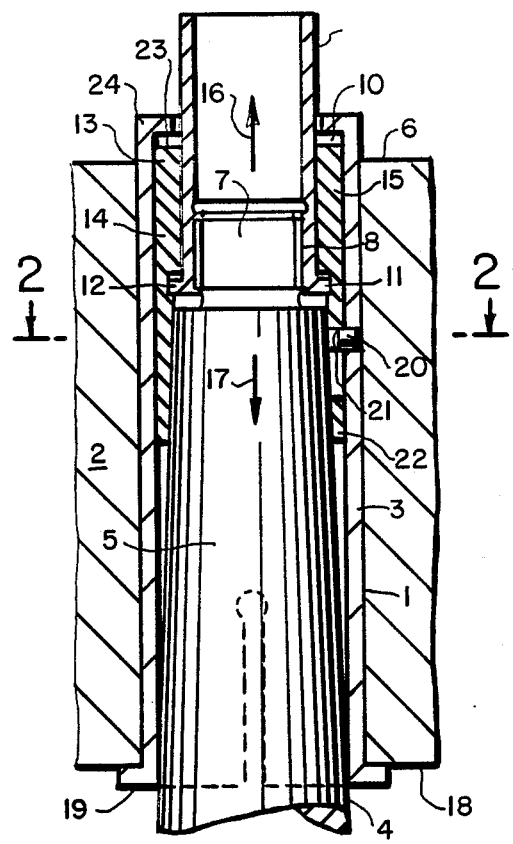
FIG.1
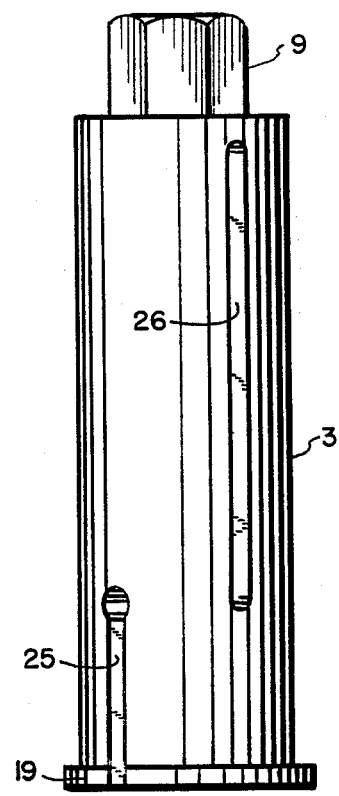
FIG.3
FIG.2
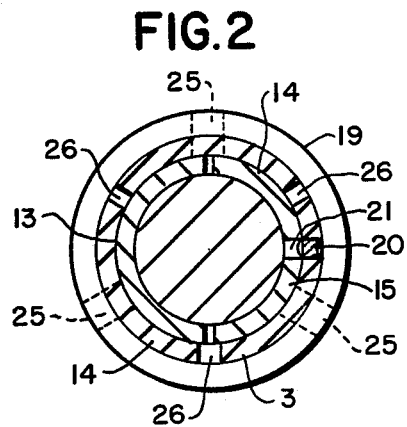

CENTRIFUGE

BACKGROUND OF THE INVENTION

The invention relates to a centrifuge having a working head placed on a shaft driven by a motor, in which a longitudinally slotted sleeve is disposed between the shaft and a central bore of the working head, and the sleeve is tightened against the bore by a conical spreader by means of an element screwed onto the end of the drive shaft.

A centrifuge of this kind is disclosed in DE-OS No. 25 01 513. In this centrifuge a sleeve-like element prolonging the drive shaft is placed on the latter, and on it is placed the working head. The upper part of this sleeve is of slotted construction and is tightened by a spreader cone against the central bore of the working head by means of a screw threaded onto the drive shaft. Coupling is produced only in the bottom area of the central bore, between the expanded sleeve and the working head, while the working head is not positively gripped in the upper part of the bore.

The invention is addressed to the problem of creating a tight, wobble-free fastening between the working head and the drive shaft of a centrifuge, that will be reliable even after long use and frequently changing torque, but which on the other hand will assure easy release.

SUMMARY OF THE INVENTION

This problem is solved according to the invention in that the shaft has a tapered end, and the spreader, which is a cylinder with a tapered bore, is placed on this end which reaches into the central bore of the working head, and that the threaded element has on its outer circumference projections which engage in recesses in the spreader. The spreader, which due to its conical bore has a tapering cross section, couples the upper part of the sleeve to the upper part of the central bore. On account of the conical configuration of the shaft of the motor in the area of the central bore, the sleeve, which is made radially expandable by slots, is gripped against the bore of the working head at its end adjacent the motor. With this arrangement a coupling is produced between the motor shaft and the sleeve and working head, both in the upper part and in the lower part of the central bore. Since the threaded element engages the spreader by means of projections disposed on its outer circumference, the spreader is on the one hand forced between the motor shaft and sleeve when the threaded element is tightened, while on the other hand, again due to these projections, when the coupling is released, the spreader is withdrawn from the interstice between the conical end of the motor shaft and the sleeve. On account of the fact that the coupling between the motor shaft and the working head is created in the area of the upper and lower end of the central bore, a wobble-free mounting of the working head is achieved, even after a great number of alternating stresses.

In an advantageous development, the projections of the threaded element are constituted by a circumferential flange which engages a radial groove in the conical bore of the spreader. In this manner, in each position of the threaded element, its circumferential flange is in engagement with the radial groove in the spreader.

A secure contact between the working head and the motor shaft and sleeve is assured by a flange on the end of the sleeve adjacent the motor. A good, tight fit between shaft and sleeve is achieved by conforming the inside of the sleeve at its end facing the motor to the shape of the motor shaft. To prevent any relative rotation between the spreader and the sleeve when the coupling is tightened or loosened, a locking element can be provided for this purpose, which, in an advantageous development, is a pin reaching radially from the sleeve into an axial groove in the spreader. The spreader is able to shift axially in the groove during tightening and during loosening.

A flange turned radially inwardly at the upper end of the sleeve is advantageous. This flange forms an abutment for the spreader and, when the assembly is being loosened, the spreader abuts against it and, by means of the threaded element, the working head can be completely disengaged, if necessary, from the motor shaft. Instead of the flange, a ring (e.g., a Seeger ring) projecting above the outside surface of the spreader can be used.

To assure a good expansion of the spreader when it is driven between the sleeve and the motor shaft, it is advantageous if the spreader is provided on its tapered end with at least one axial expansion slot, or if the spreader is made bipartite in the form of approximately semicylindrical half-shells.

BRIEF DESCRIPTION OF THE DRAWING

Further details and features of the invention will appear in the following description of an embodiment in conjunction with the drawing, wherein:

FIG. 1 shows a working head in the area of its central bore with the shaft mounting represented in cross section.

FIG. 2 is a section along line II—II in FIG. 1, and

FIG. 3 is an elevational view of the sleeve shown in FIG. 1.

DETAILED DESCRIPTION OF PREFERRED EMBODIMENT

As it can be seen in FIG. 1, a sleeve 3 is inserted into a central bore 1 of a working head 2, and is then placed on the end of the shaft 4 of the motor. The end 5 of shaft 4 reaching into the central bore 1 and the sleeve 3 is tapered in the direction of the top 6 of the working head. At the upper end of shaft 4 there is a prolongation 7 with an external thread 8 on which a threaded element 9 is screwed. This threaded element 9 is a tubular piece whose free end in this embodiment extends through an opening in the sleeve 3. The outside diameter of the threaded element is approximately one-third smaller than the inside diameter of the sleeve 3, so that a radial interstice 10 remains between the sleeve 3 and the threaded element. At the bottom end of threaded element 9 adjacent the end of the shaft 4 there are projections 11 extending radially outwardly, which engage indentations 12 in a conical spreader 13. The spreader 13 is a tube composed of two approximately semicylindrical half-shells 14 and 15, as it can be seen in FIG. 2, which are seated as wedges between the tapered end 5 of shaft 4 and the sleeve 3. By turning the threaded element 9 on the shaft prolongation 7, the spreader 13 with its half-shells 14 and 15 is displaced in the axial direction, namely in the direction of the arrow 16 when the threaded element 9 is loosened, and in the direction of the arrow 17 when the threaded element 9 is tightened. At the bottom end of the sleeve 3, and facing the bottom 18 of the working head 2 there is formed a circumferential, outwardly turned flange 19, against which the working head abuts. In the area of this bottom end of the sleeve, associated with the motor, its interior is chamfered and thus adapted to the taper of shaft 4.

To fasten the working head to the shaft 4 of the motor, first the two approximately semicylindrical pieces 14 and 15 of the spreader 13 are introduced from the underside 18 of the working head 2 into the central bore 1, together with the threaded element 9 whose circumferential projection 11 engages corresponding indentations 12 of the spreader. One of the spreader halves 14 and 15 is held by means of a set screw or pin 20 threaded into a bore 21 in the sleeve 3 and engaged in an axial slot in the one of the approximately semicylindrical halves 14 or 15. The sleeve 3, together with the half-shells 14 and 15 and the threaded element 9, is inserted from the underside 18 of the working head into the central bore 1. Then the working head 2 is placed with the sleeve 3 onto the end 5 of the shaft 4. The taper of shaft 4 expands the sleeve 3, so that a coupling is produced between the shaft, the bottom part of the sleeve 3 and the working head 2. By tightening the threaded element 9 in the direction of the arrow 17, the half-shells 14 and 15 are drawn downward into the tapered interstice 10 between the end of the motor shaft and the inside of the sleeve 3, thereby producing a tightening of the sleeve in the upper part of the central bore 1. The set screw engaging the one half-shell 14 or 15 in this case serves the purpose of preventing the two half-shells 14 and 15 from turning as the threaded element 9 is being tightened. The slot 22 permits axial displacement of the half-shells 14 and 15. When the coupling is released by means of the threaded element 9, the two half-shells 14 and 15 are displaced in the direction of the arrow 16 by means of the projections 11 engaging in the indentation 12. If the working head or the sleeve 3 should seize to the bottom part of the shaft 4 and release should be impossible, the half-shells 14 and 15 are displaced by means of the threaded element 9 in the direction of the arrow 16 until their upper end 23 engages an inwardly turned collar 24 at the upper end of the sleeve 3 and, after further turning of the threaded element 9, the motor shaft taper is driven out of the lower part of the sleeve 3. After the coupling at the bottom part of the sleeve and central bore 1 is released the working head can be removed. Three lower slots 25 offset at 60° from one another are created in the sleeve 3, in the lower third of the sleeve 3, and in the upper part of the sleeve 3 three additional slots 26 are provided, which are offset by 60° from the lower slots 25, and begin approximately at the end of the lower slots 25. These slots permit the sleeve to be expanded sufficiently both in the lower and in the upper part thereof.

We claim:

1. In a centrifuge having a working head placed on a shaft driven by a motor, in which a tapered spreader and a longitudinally slotted sleeve are respectively disposed between the shaft and a central bore of the working head, which sleeve is clamped against the bore by said spreader by means of a threaded element screw on the end of the motor shaft, the improvement wherein said shaft has a tapererd end and said spreader, which is in the form of a bushing with a tapered bore, is mounted on said working head, and wherein said threaded element has on its outer circumference projections which engage indentations in said spreader.

2. The improvement according to claim 1, wherein said projection of said threaded element are formed by a circumferential flange which engages a radial groove in said spreader.

3. The improvement according to claim 1, wherein said sleeve has on its end facing the motor a flange on which said working head is placed, and wherein said sleeve is adapted on its inside to the taper of said drive shaft in the region of said sleeve end.

4. The improvement according to claim 1, wherein said spreader and the sleeve are secured against turning against one another by a securing element.

5. The improvement according to claim 4, wherein said securing element is a radially extending driver pin which engages an axial slot in said spreader.

6. The improvement according to claim 1, wherein said sleeve has on its upper end a collar which is turned radially inwardly.

7. The improvement according to claim 1, wherein said spreader has at least one axial expansion slot at its tapered end.

8. The improvement according to claim 1, wherein said spreader comprises approximately semicylindrical half-shells.

* * * * *